US008922063B2

(12) United States Patent
Taddeo (10) Patent No.: US 8,922,063 B2
(45) Date of Patent: Dec. 30, 2014

(54) CIRCUIT FOR RENDERING ENERGY STORAGE DEVICES PARALLELABLE

(75) Inventor: Stephen Randolph Taddeo, Long Beach, CA (US)

(73) Assignee: Green Charge Networks, LLC, Santa Clara, CA (US)

( * ) Notice: Subject to any disclaimer, the term of this patent is extended or adjusted under 35 U.S.C. 154(b) by 684 days.

(21) Appl. No.: 13/095,270

(22) Filed: Apr. 27, 2011

(65) Prior Publication Data

US 2012/0274145 A1 Nov. 1, 2012

(51) Int. Cl.
*H02J 1/12* (2006.01)
*H02J 7/00* (2006.01)

(52) U.S. Cl.
CPC ................ *H02J 1/12* (2013.01); *H02J 7/0065* (2013.01); *H02J 2007/0067* (2013.01)
USPC .......................................................... 307/82

(58) Field of Classification Search
None
See application file for complete search history.

(56) References Cited

U.S. PATENT DOCUMENTS

| | | | |
|---|---|---|---|
| 3,956,638 A | 5/1976 | Ahrens | |
| 4,272,806 A | 6/1981 | Metzger | |
| 4,663,579 A | 5/1987 | Yang | |
| 5,473,528 A | 12/1995 | Hirata | |
| 5,583,753 A | 12/1996 | Takayama | |
| 5,602,481 A | 2/1997 | Fukuyama | |
| 5,734,205 A | 3/1998 | Okamura | |
| 5,760,570 A | 6/1998 | Nagai | |
| 6,208,039 B1 | 3/2001 | Mendelsohn | |
| 6,281,662 B1 | 8/2001 | Flohr | |
| 6,583,523 B1 | 6/2003 | Bhate | |
| 6,774,606 B1 | 8/2004 | Hall | |
| 6,985,799 B2 * | 1/2006 | Zalesski et al. ............... | 700/286 |
| 7,064,521 B2 | 6/2006 | Stanesti | |
| 7,274,116 B2 * | 9/2007 | Inoue et al. ................... | 307/100 |
| 7,394,225 B2 | 7/2008 | Guang | |
| 7,414,381 B2 | 8/2008 | Popescu-Stanesti | |
| 2003/0107352 A1 * | 6/2003 | Downer et al. ................. | 322/40 |
| 2004/0008031 A1 * | 1/2004 | Arai et al. ..................... | 324/429 |
| 2005/0275373 A1 | 12/2005 | Guang | |
| 2007/0246943 A1 * | 10/2007 | Chang et al. .................... | 290/44 |
| 2008/0258678 A1 * | 10/2008 | Kanouda et al. .............. | 320/101 |
| 2010/0315043 A1 * | 12/2010 | Chau ............................. | 320/134 |

* cited by examiner

*Primary Examiner* — Rexford Barnie
*Assistant Examiner* — David Shiao
(74) *Attorney, Agent, or Firm* — Richard C. Galati; Holland & Hart LLP (57) ABSTRACT

A circuit for rendering an energy storage device parallelable comprised of an energy storage device connected to a power adapter that converts the potential of the energy storage device into a potential that follows a predetermined function of the state of charge of the energy storage device. When multiple assemblies are paralleled, they may be charged and discharged as a whole with individual storage devices maintaining equal states of charge. The energy storage devices can be batteries with different cell counts, configurations, and energy discharge profiles. In some cases, the power adapters are comprised of DC to DC converters and system controllers that are used to translate each battery's energy discharge profile into a user-determined energy discharge profile that is a predictable function of the battery's state of charge and independent of temperature or other external conditions.

20 Claims, 7 Drawing Sheets

CIRCUIT FOR RENDERING ENERGY STORAGE DEVICES PARALLELABLE

CROSS-REFERENCE TO RELATED APPLICATIONS

Not applicable.

STATEMENT REGARDING FEDERALLY SPONSORED RESEARCH

Not applicable.

THE NAMES OF THE PARTIES TO A JOINT RESEARCH AGREEMENT

Not applicable.

BACKGROUND

1. The Field of the Invention

The present invention generally relates to apparatus and methods for transferring electrical power to and from electrical energy storage devices, and more particularly to a method and circuit for charging and discharging a plurality of parallel connected batteries connected to a plurality of DC to DC converters.

2. Description of Related Art

Battery-powered electric vehicles (EVs) are in high demand in automotive markets around the world. Each year thousands of EVs are manufactured, and in like manner their batteries are mass-produced from lithium and other raw materials. Because these batteries are used in vehicles, they have high energy storage capacity, high temperature resistance, strict safety requirements, and reliable energy discharge profiles. As their host vehicles age, these valuable batteries may end up in landfills and junkyards. Lithium prices are still relatively low, and the cost of recycling a battery is significantly higher than the value of its components, so battery recycling programs that reclaim the raw materials for reuse are few and far between. Some government programs offer this kind of battery recycling, but they mainly relate to cellular phone or notebook computer batteries and, even more importantly to the industry, tend to operate at a loss. Governments can justify their recycling programs' inefficiency by touting projected environmental benefits, but commercial and industrial enterprises typically cannot afford such operations. To these enterprises, a preferable solution would be to repair and reuse the batteries they already own, without resorting to complete reconstructions, or to resell them for use in other applications.

Unfortunately, EV batteries are not interchangeable between EVs, and are difficult to adapt to other applications as well. Each EV has different battery requirements and battery management hardware and software, and it is difficult to safely connect a used battery to a load because the sizes, capacities, voltages, and other essential characteristics vary from one discarded used battery to the next. If these batteries could be connected notwithstanding their differences, banks of high-quality EV batteries could be recycled for various energy storage needs. Notebook computer batteries and batteries of other devices could be likewise recycled and repurposed for different applications.

High-capacity storage applications are a prime field to use these EV batteries. This would entail connecting the batteries in parallel, meaning the positive terminals are all connected to each other, and the negative terminals are similarly connected, because parallel topology allows each of the batteries to contribute power to the load simultaneously for a longer duration and at a lower voltage than if they were connected in series. There are limited practical circuit designs where used or dissimilar batteries are connected in parallel because of difficulties in charging and discharging the batteries effectively. Connecting dissimilar batteries in parallel results in improper polarization of the electrodes of one or both batteries, reduced battery life, possibility of rupture, reduced electrical storage capacity, and, disproportionate utilization of battery capacities.

Some systems in the field of battery circuit design have addressed these issues by connecting diodes to the batteries to prevent circulating or back-flowing currents when the batteries are connected in parallel and to avoid a situation where the discharge of one battery charges another. In this case, the forward voltage drop of the diode can be large compared to the battery voltage, and the use of the diodes introduces losses in the energy transfer from the batteries.

Some systems connect DC to DC converters to the batteries in order to alter the current to voltage ratio at each battery to match an average level, thereby minimizing back-flowing currents. DC to DC converters are a type of power converter used to bridge a power source of electronic equipment to a load and are especially used in connection with portable equipment powered by batteries. The converters are circuits most often configured to convert a source of direct current (DC) from one voltage level to another. Switched-mode power converters convert voltage by storing input energy temporarily and then releasing that energy at a different voltage. The storage may be in either magnetic field storage components (e.g., inductors) or electric field storage components (e.g., capacitors).

When connected in parallel, systems with DC to DC converters are interdependent among the parallel branches of the circuit. This means that the DC to DC converter of a given branch relies on measurements of signals from the converters of other branches in order to keep the voltage output of the given branch equivalent to the other branches. For energy storage devices like batteries, voltage is one of the measured quantities used to indicate state of charge, and is also a quantity that is forced to match the other branches such that every branch has the same voltage. Hence, new parallel elements must have a voltage-to-charge profile that is similar to the other paralleled elements or there will be differences in the state of charge of the various branch-connected storage devices resulting in inefficiency over charge and discharge cycles or damage to the parallel elements. Voltage or some other parallelable quantity such as rotational velocity must always play this role in any system of parallel-connected energy storage devices.

Other techniques for connecting multiple batteries in parallel include oversizing the battery cell capacity to account for loss, or providing a relay and switch matrix to compensate for multiple battery cell failures. Still other designs incorporate elements to reduce wear on the parallel-connected batteries by feeding shared load current readings in a feedback loop to battery voltage converters to correct irregularities in each battery's current output. These solutions are also interdependent among the parallel branches of the circuit, and new parallel elements must have an energy discharge profile (or some other measureable quantity-to-discharge profile) that is similar to the other paralleled elements or there will be unused capacity of the batteries and decreased efficiency.

The subject matter claimed herein is not limited to embodiments that solve any disadvantages or that operate only in environments or only using measurables such as those

BRIEF SUMMARY

In accordance with some embodiments of the present invention, a circuit rendering an energy storage device parallelable is provided. The circuit comprises an energy storage device having a state of charge and a source connection with a source potential and a power adapter having a first connection electrically connected to the source connection and a second connection having a terminal potential. In this embodiment the power adapter converts between the source potential and the terminal potential by following a predetermined function of the state of charge of the energy storage device.

In another embodiment of the invention, the power adapter of the circuit is comprised of a DC to DC converter that has at least a first connection, a second connection, and a third connection, where the first connection is electrically connected to the source connection, and the third connection has a terminal potential. The power adapter is further comprised of a system controller that has a controller connection electrically connected to the second connection of the DC to DC converter. Here, the system controller directs the DC to DC converter to convert between the source potential and the terminal potential by following a predetermined function of the state of charge of the energy storage device.

In yet another embodiment, the system controller directs the DC to DC converter to convert between the source potential and the terminal potential by supplying a duty factor to the DC to DC converter.

In yet another embodiment, the system controller adjusts the duty factor supplied to the DC to DC converter by calculating the state of charge of the energy storage device, calculating a reference voltage by comparing the state of charge to a set of desired behavioral parameters, using a feedback control loop to determine the adjustment to the duty factor by comparing the reference voltage to a measurement of the present terminal potential, and outputting an adjusted duty factor to the DC to DC converter, whereby the DC to DC converter converts between the source potential and the terminal potential according to the adjusted duty factor.

In yet another embodiment, the desired behavioral parameters are a monotonic function of the state of charge of the energy storage device.

In yet another embodiment, the desired behavioral parameters are a linear function of the state of charge of the energy storage device.

In yet another embodiment, the desired behavioral parameters are a function to approximate an energy discharge profile of an energy storage device selected from a group consisting of real and theoretical energy storage devices. For example, a real energy storage device such as a battery would have a real energy discharge profile that is observed when the battery is discharged through a load. A theoretical energy storage device such as an "average" battery or "ideal" battery would have a theoretical energy discharge profile that could be expected if the battery was actually built and tested.

In yet another embodiment, the system controller is a pulse width modulation (PWM) controller that adjusts the duty factor of the DC to DC converter.

In yet another embodiment of the invention, the system controller is electrically connected to a start switch, and the system controller will not permit the DC to DC converter to output the terminal potential unless the start switch is closed.

In yet another embodiment, the energy storage device is selected from a group consisting of batteries, flywheels, fuel cells, capacitive devices, pumped hydro, compressed gas, superconductive magnetic energy storage, and combinations thereof.

In yet another embodiment, the circuit further comprises a user interface connection, and the terminal potential of the second connection of the power adapter is electrically connected to the user interface connection.

In another embodiment, the circuit further comprises an inverter having a DC connection, and the second connection of the power adapter is electrically connected to the DC connection.

In another embodiment, the terminal potential of the second connection of the power adapter is electrically connected to a user interface connection in parallel with a parallel circuit element having a parallel source potential that has an energy output that at least approximately follows the predetermined function of the state of charge of the energy storage device connected to the first connection of the power adapter.

In another embodiment, the terminal potential of the second connection of the power adapter is electrically connected to a user interface connection in parallel with an additional parallel energy storage device having an additional source potential that is connected to the user interface connection via an additional power adapter that converts the additional source potential into an additional terminal potential that has an energy discharge profile that at least approximately follows the predetermined function of the state of charge of the energy storage device connected to the first connection of the power adapter. Thus, a first power adapter and energy storage device pair is connected to a user interface connection with a second power adapter and energy storage device pair, and each pair outputs an energy discharge profile to the user interface connection that approximately follows the other pair.

In another embodiment, the terminal potential of the second connection of the power adapter is electrically connected to a load and the energy storage device is discharged to supply power to the load.

In yet another embodiment, the terminal potential of the second connection of the power adapter is electrically connected to a power source and the energy storage device is charged by power supplied by the power source that passes from the power source through the power adapter to the energy storage device. The power that passes through the power adapter to the energy storage device may also be converted according to a predetermined function of the state of charge of the energy storage device.

In some embodiments, a method of connecting an energy storage device in parallel with additional energy storage devices is provided. The method comprises connecting an energy storage device having a source potential and a state of charge to a DC to DC converter, connecting a system controller to the DC to DC converter (wherein the system controller directs the DC to DC converter to convert the source potential into a terminal potential), setting the system controller to direct the terminal potential of the DC to DC converter to follow a predetermined function of the state of charge of the energy storage device, and connecting an output of the DC to DC converter in parallel with an additional energy storage device having a terminal potential that at least approximately follows the predetermined function of the state of charge of the energy storage device.

In other embodiments of the invention, a method for connecting a plurality of batteries in a parallel topology is provided. The method comprises connecting at least two batteries to at least two DC to DC converters, such that each battery is connected to a different DC to DC converter, and wherein each of the batteries has a state of charge and a battery voltage, connecting at least two system controllers to the DC to DC converters, such that each DC to DC converter is connected to a different system controller, instructing the system controllers to direct the DC to DC converters to produce an output voltage that follows a predetermined function of the state of charge of the batteries, wherein the energy discharge profiles of each of the DC to DC converters are the same, and connecting the output voltages of the DC to DC converters in parallel to a user interface connection.

Embodiments of the invention make it possible to charge and discharge an energy storage device through a power adapter while connected in parallel with other elements. An advantage of some embodiments of the invention is to allow the power adapter's terminal potential output to follow a predetermined function of the state of charge of the energy storage device. By controlling the power adapter's terminal potential output to follow a predetermined function of the state of charge of the energy storage device, the power adapter can be connected in parallel to other circuit elements that follow the same predetermined function as their outputs, so energy storage devices, such as, for example, EV batteries that may have different cell counts, open-circuit voltages, and chemical compositions, can be connected in parallel for charging from (and discharging to) a common user interface connection. It is an advantage of some embodiments that dissimilar batteries can be recycled more easily because they can be connected in parallel and adapted to applications where, for example, high charge storage capacity is needed, since if the storage capacity of one battery is insufficient, more can be added in parallel to increase the overall capacity observed at the user's interface connection. An additional advantage of some embodiments is the ability to allow a single energy storage device to render its real energy discharge profile into an ideal energy discharge profile or a close approximation thereof. For example, in these embodiments a sag in voltage from a battery would be preferably undetectable from the other side of a power adapter connected to it.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter. Additional features, embodiments, and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE SEVERAL
VIEWS OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features. It is to be appreciated that these drawings depict only typical embodiments of the invention and are therefore not to be considered limiting of its scope.

DETAILED DESCRIPTION

Figure 1:
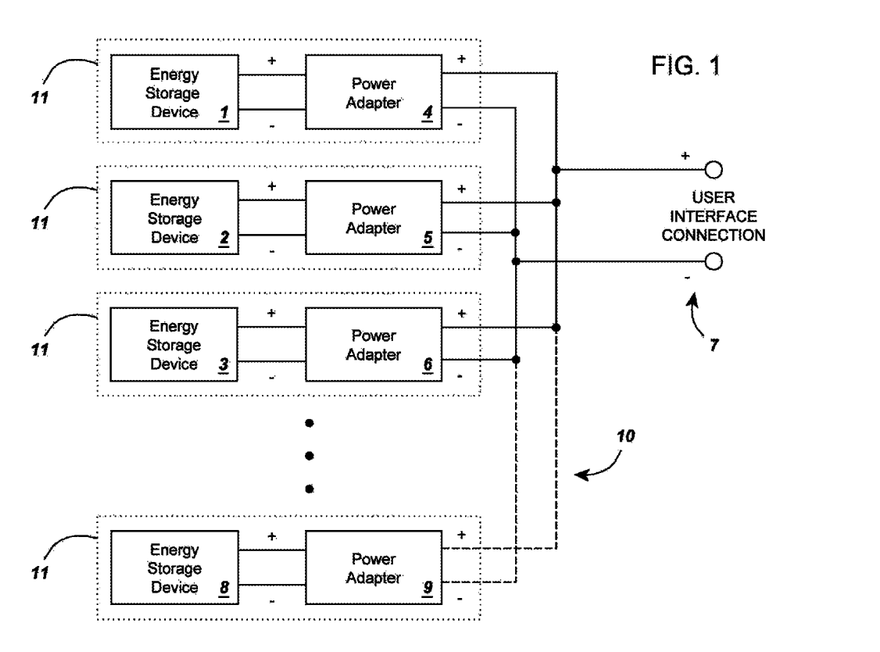
FIG. 1 shows an insertion block diagram of a circuit according to an embodiment of the present invention.

Referring now to the drawings, FIG. 1 shows a block diagram of a circuit according to an embodiment of the present invention. Several energy storage devices 1, 2, and 3 are shown connected to an equal number of power adapters 4, 5, and 6. The power adapters 4, 5, and, 6 are connected in parallel to a user interface connection 7. In this embodiment, additional energy storage devices can be added to the circuit, such as energy storage device 8, provided that each energy storage device is connected through an additional power adapter 9 to the user connection 7 via the connections 10 shown as dashed lines. In this embodiment, each parallel block 11 outputs the same voltage to the user interface connection 7, so each parallel block 11 can be added or removed without affecting the other parallel blocks, and properties of each of the energy storage devices 1, 2, 3, and 8 are indistinguishable at the user interface connection 7.

As used herein, a "connection" refers to a link capable of transferring power from one link to another, such as, for example, an electrical connection, terminal, wire, valve, or mechanical transmission.

In some embodiments, the energy storage devices 1, 2, 3, and 8 are electrochemical batteries or cells that store energy, but other energy storage devices may be used, such as, for example, capacitive devices, superconducting magnetic energy storage devices, pumped hydro energy storage, compressed air or gas storage devices, or flywheel energy storage devices. Other devices are also contemplated, insofar as the devices each have (1) at least one measurable quantity that can be used to determine their state of charge and (2) at least one parallelable quantity that can be equalized across multiple storage devices when they are connected in parallel with power adapters 4, 5, 6 and 9. For example, in one embodiment the energy storage devices are lead-acid batteries, so the measurable quantity may be the specific gravity of the batteries (because specific gravity may be used to determine their state of charge), and the paralleled quantity may be their output voltage (because voltage may be equalized across multiple batteries). If the energy storage devices are gas chambers, the gas pressure of the chambers could be the measurable quantity and the paralleled quantity.

In some embodiments, the energy storage devices 1, 2, 3, and 8 have electrical properties that are different from each other, such as, for example, different output terminal voltages, output currents, voltage profiles, charge rates, discharge rates, numbers of cells, power ratings, energy ratings, open-circuit voltages, internal resistances, nominal voltages, cutoff voltages, cycle lives, specific energies, or charge currents.

In some embodiments, the user interface connection 7 is an electrical output, such as, for example, wires, terminals, an electrical outlet, or other electrical connection means. Those skilled in the art of electronics may readily find alternative electrical connection means by which the circuit can be used to transfer power to and from the energy storage devices.

Figure 2:
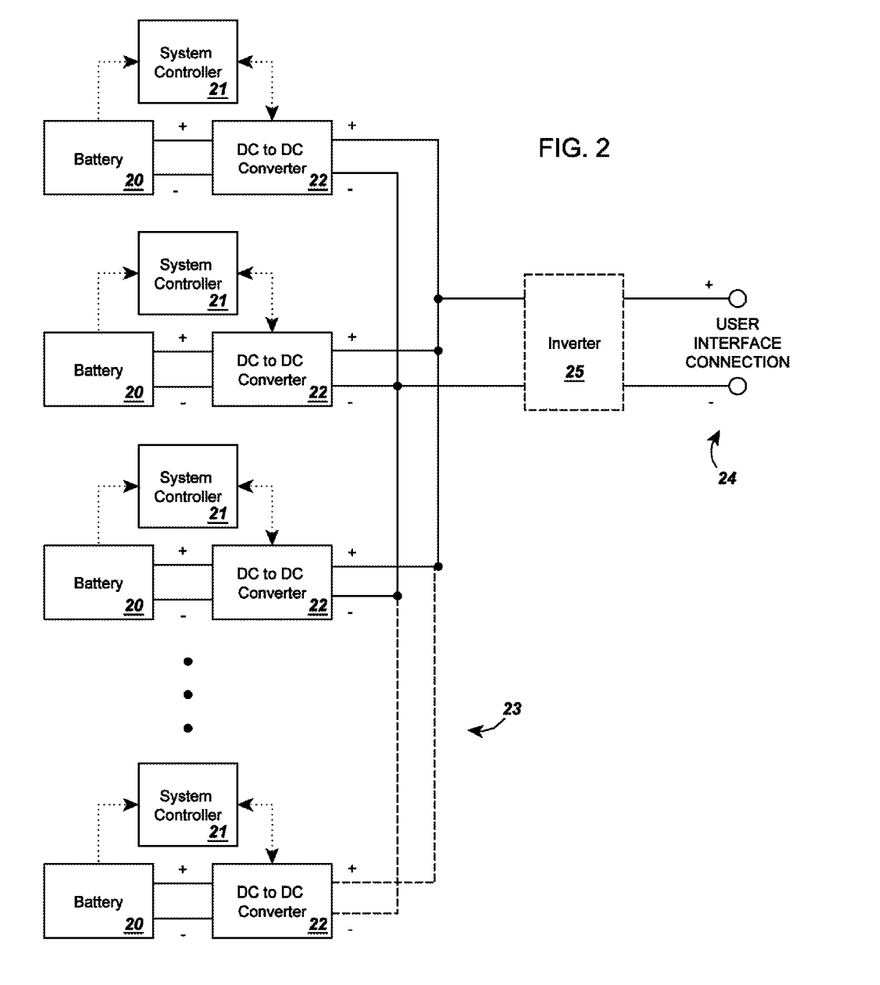
FIG. 2 shows a block diagram of a circuit of parallelized batteries connected in parallel according to an embodiment of the present invention.

In some embodiments, the power adapters 4, 5, 6 and 9 are comprised of DC to DC converters and system controllers, as depicted in FIG. 2, a block diagram of a circuit of parallelized batteries connected in parallel. Each DC to DC converter 22 converts the storage potential (in volts) from a battery 20 into a terminal potential (in volts) according to a DC to DC duty factor ratio calculated by a system controller 21. The system controllers 21 (a) measure the storage potential and other operating conditions of the batteries 20 over time, (b) calculate adjustments to the terminal potential output from the DC to DC converters 22, and (c) transmit their adjusted instructions to the DC to DC converters 22. As a result, each DC to DC converter 22 provides a uniform terminal potential to the user interface connection 24. The standardized terminal potential output follows a programmable voltage profile that is independent of battery type.

The circuit of FIG. 2 shows that the circuit may be modified in some embodiments by an inverter 25. The inverter 25 can be unidirectional or bidirectional to allow for charging and discharging of the batteries 20 or other connected energy storage devices. In some embodiments the inverter 25 converts the DC voltage from the DC to DC converters 22 into AC voltage for the user connection 24, and vice versa. The DC connection of the inverter 25 is an electrical interface that connects the inverter 25 to DC circuit elements.

Figure 3:
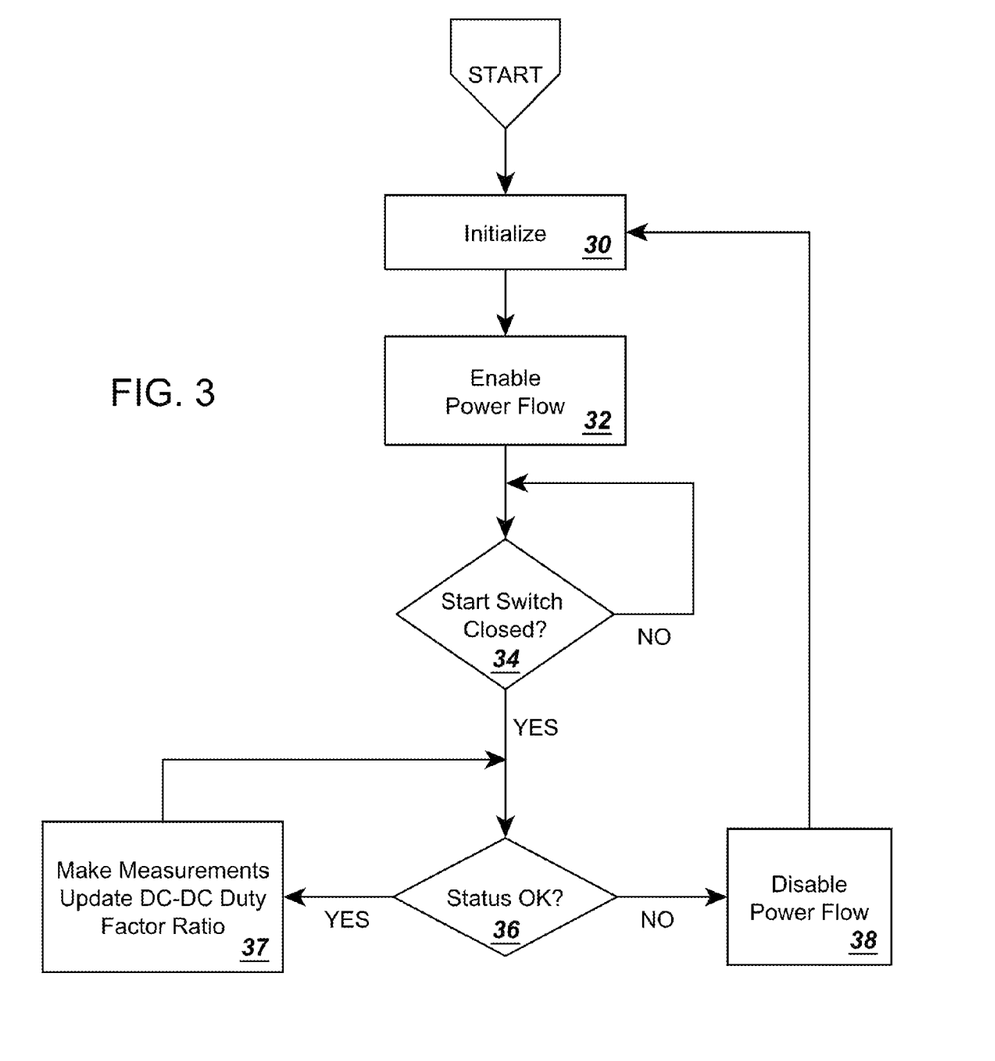
FIG. 3 is a flowchart depicting a portion of the algorithm programmed into the firmware of a system controller of an embodiment of the present invention.

FIG. 3 is a flowchart depicting a portion of the algorithm programmed into the firmware of a system controller of an embodiment of the present invention. First, the controller initializes 30. Next, it enables power flow 32 through the DC to DC converter and waits for a start switch or button to be closed 34. Once closed, if the status of the system is okay 36, the controller makes measurements and updates the DC to DC converter duty factor ratio 37. If the status of the system is not okay 36, the controller disables the power flow 38 and loops back to the initialize step 30. These steps will now be discussed in further detail.

In the algorithm of FIG. 3, the system controller initializes 30. In executing this step, the system controller determines that a proper energy storage device is electrically connected to a proper DC to DC converter and that storage potential measurements, operating conditions measurements, and terminal potential measurements can be made for the completion of steps 34, 36, and 37, and determines whether the user has provided a target terminal potential or desired behavioral parameters. With these factors in place, the system is prepared for successful operation.

In the algorithm, the system controller enables power flow 32, meaning the system controller permits energy to flow between the energy storage device and the DC-DC converter.

In the algorithm, the system controller determines whether a start switch or button is closed 34. A start switch is not a requirement in every embodiment of the invention, but in this embodiment the start button is a safety feature that allows the user to connect the power adapter electronics to the user interface connection with less risk of shorting or shock. The switch cuts off the terminal potential from being output by the power adapter to the user interface connection until it is closed. Any switching means previously known in the art may be used to perform this switching task.

In the execution of the algorithm, the system controller determines whether the status of the system is okay 36. Here, the system controller measures the operating conditions of the energy storage device and decides whether it is safe to allow the flow of power to the user interface connection. For example, excessive overheating of the energy storage device or DC to DC converter and degradation in the fidelity of the signal measurements would return a result of NO and the controller would proceed to step 38, but if all of these indicators are in working order, a result of YES would return and the controller would proceed to step 37.

In the algorithm, the system controller disables the power flow 38. In this step, the controller shuts off power flow because the status of the system is not acceptable under step 36, and the system must re-initialize 30 before resuming operation.

In the algorithm, the system controller makes measurements and updates the DC to DC converter duty factor ratio 37. This step is described in greater detail in connection with FIG. 4.

Figure 4:
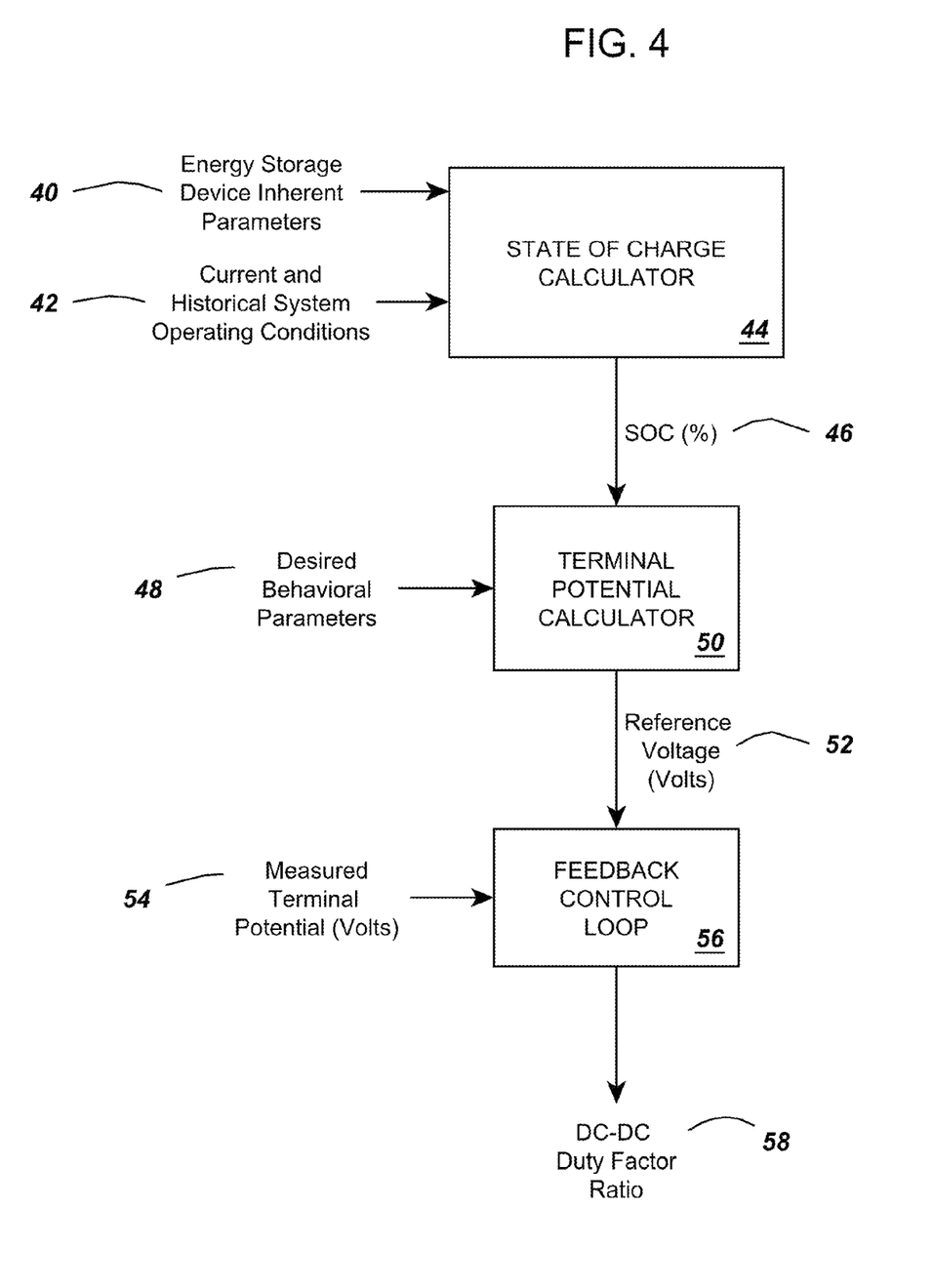
FIG. 4 is a signal flow diagram depicting the process by which the DC-DC duty factor ratio is updated according to an embodiment of the present invention.

Referring now to FIG. 4, a signal flow diagram is shown depicting the process by which the DC-DC duty factor ratio is updated according to an embodiment of the present invention. The duty factor ratio herein refers to the ratio of the on-time of the DC to DC converter to the total amount of on-time and off-time. By setting the duty factor, the system controller directs the converter to convert storage potential to the desired terminal potential. To determine the proper duty factor ratio, the energy storage device's inherent parameters 40 and current and historical system operating conditions 42 are provided to a state of charge calculator 44 that outputs a state of charge value 46 in percent form or as a value corresponding to a percent, such as, for example, a number ranging from 0.0 to 1.0. The state of charge information 46 and the desired behavioral parameters 48 from the user are input to a terminal potential calculator 50 which outputs a reference voltage 52. The reference voltage 52 and a measured terminal potential 54 are entered into a feedback control loop 56 and converted into a DC-DC duty factor ratio output 58. The elements of this figure will now be described in further detail.

The energy storage device's inherent parameters 40 are characteristics of the energy storage device that are used to calculate its state of charge by the state of charge calculator 44, such as, for example, the energy storage device's nominal voltage, internal resistance, discharge rate, and capacity rating. In some embodiments these values may be input by the user, and in others they may be programmed into the system controller's firmware in an electronic storage medium or other selectable directory of energy storage device properties.

The current and historical system operating conditions 42 refer to current and historical readings of voltages, temperatures, currents, and other like system properties that may be relevant to calculating the state of charge of the energy storage device.

The state of charge calculator 44 calculates state of charge of the energy storage device according to standard methods to produce a state of charge readout 46, such as, for example, coulomb counting or internal impedance measurements.

The desired behavioral parameters 48 in this embodiment of the present invention are in the form of voltage functions by which the user desires the energy storage devices to output their energy. For example, the desired behavioral parameters 48 may be set to follow a linear function of voltage output over time. Preferably, the desired behavioral parameters 48 follow a monotonic function wherein each desired voltage or potential corresponds with a single desired state of charge because there is less room for misleading results in the calculations of the reference voltage 52. If the function is not monotonic, the system controller might not determine the correct reference voltage because more than one state of charge corresponds to the same reference voltage. Nevertheless, in some embodiments, non-monotonic functions are within the scope of the output of the present invention.

The terminal potential calculator 50 uses the state of charge readout 46 (i.e., the state of charge value or the corresponding depth of discharge value) and desired behavioral parameters 48 to produce the reference voltage 52.

In some embodiments of the present invention the terminal potential calculator 50 uses the following equation to calculate the reference voltage 52:

$$V_{reference} = V_{initial}(1 - DOD * k),$$

wherein:
$V_{reference}$ = reference voltage,
$V_{initial}$ = desired initial output voltage of the energy storage device,
DOD = depth of discharge, ranging from 0.0 to 1.0, and
k = a constant of proportionality, which can be any non-negative real number.

Figure 5:
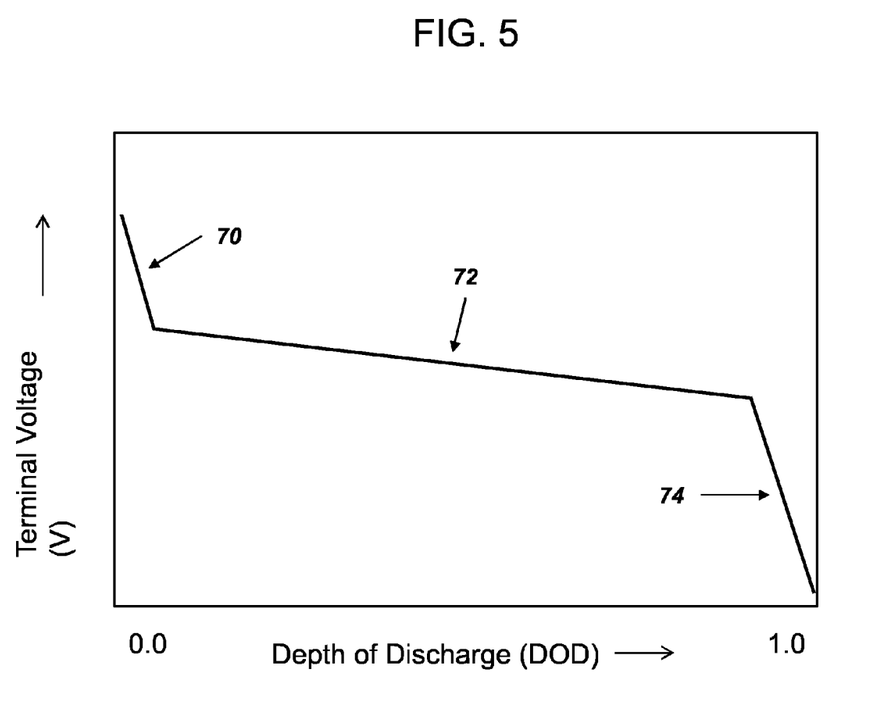
FIG. 5 is a graph depicting a sample idealized voltage discharge profile for an energy storage device according to an embodiment of the present invention.

In this example, the desired behavioral parameters 48 are comprised of the desired initial output voltage of the energy storage device, the constant of proportionality, and the information regarding the relationship between those elements and the state of charge. These embodiments may vary the desired initial output voltage or the constant of proportionality when compared to the depth of discharge such that the reference voltage function is composed of multiple parts. For example, it may be advantageous to cause a steep drop in voltage when the DOD is low or when the DOD is high if the energy storage devices being modified follow a similar discharge curve when they are unmodified. This curve approximation or idealization method prevents overcharging or overdischarging the energy storage device. FIG. 5 shows an exemplary approximation of such a theoretical voltage discharge profile. A steep drop in voltage at low DOD 70 is followed by a shallow descent across another portion of the total DOD 72 which is then followed by another steep drop in voltage at high DOD 74.

Figure 6:
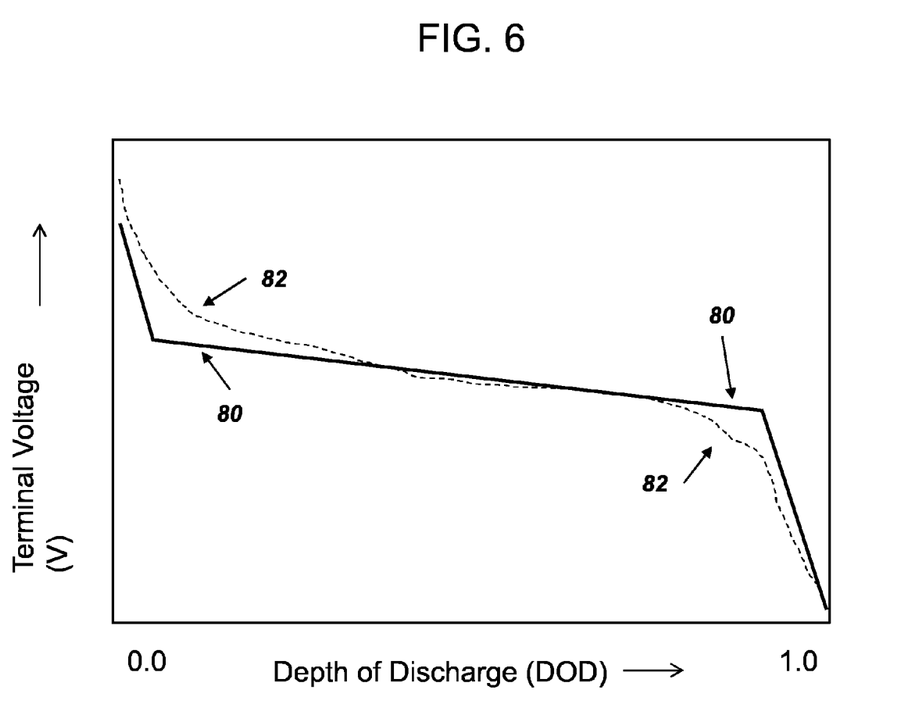
FIG. 6 is a graph depicting a sample idealized voltage discharge profile for an energy storage device and a sample non-idealized voltage discharge profile for an energy storage device according to an embodiment of the present invention.

As shown in FIG. 6, such an idealized or theoretical energy storage device energy discharge profile 80 is in one embodiment a rough approximation of a real, non-idealized energy storage device energy discharge profile 82. It is contemplated that other non-idealized voltage discharge profiles, such as, for example, a lead acid battery's more exaggerated downward midsection slope, would be better approximated by idealized voltage discharge profiles other than the profile shown 80. By causing the function to closely resemble a real or theoretical energy storage device, the system uses the connected energy storage devices to a fuller capacity, and if the approximation is close enough, a power adapter would not be required to attach the approximated power source to the circuit in parallel.

In other embodiments, the reference voltage 52 follows other profiles, such as, for example, quadratic curves, logarithmic curves, real battery approximations, or other nonlinear profiles. In the case of a real battery approximation, a sample battery profile is provided from a real battery and the reference voltage is adjusted to follow that sample profile in all of the branches of the parallel circuit. In such an embodiment, the real battery would not need to be connected to the parallel circuit with a power adapter as in 4, 5, and 6 in FIG. 1, but could be connected in parallel separately and independently.

In some embodiments, once the reference voltage 52 is calculated by the terminal potential calculator 50, the reference voltage is provided to the feedback control loop 56 along with a measured terminal potential 54. The measured terminal potential 54 represents the actual, present terminal potential of the energy storage device as opposed to the reference voltage 52 that serves as a "target" or "optimal" terminal potential for the DC to DC converter to produce. In some of these embodiments, the feedback control loop 56 amplifies the error between the present terminal potential and the reference voltage and thereby determines the adjustments that must be made to the DC-DC duty factor ratio 58 to harmonize the two values.

Figure 7:
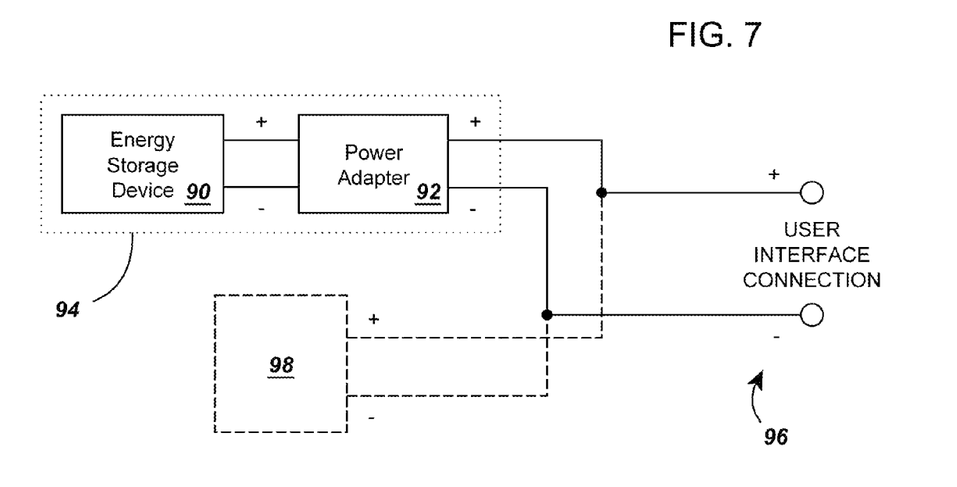
FIG. 7 shows an insertion block diagram of a circuit according to an embodiment of the present invention wherein the output of a power adapter is programmed to follow a voltage profile of another circuit element.

FIG. 7 is an insertion block diagram of a circuit according to an embodiment of the present invention wherein the output of a power adapter is programmed to follow a voltage profile of another circuit element. Here, an energy storage device 90 and power adapter 92 are electrically connected to form a block 94 that is electrically connected to a user interface connection 96. The output of the power adapter 92, and thus the block 94, is programmed to follow the properties of a parallel circuit element 98. This parallel circuit element 98 can be, for example, a generator, additional energy storage device, a second block of energy storage and power adapter similar to block 94 (much like the blocks 11 in FIG. 1), or a tie to an electrical utility distribution grid. For example, if a simple secondary battery is the parallel circuit element 98, the power adapter 92 is programmed to deliver the same voltage versus the state of charge of the secondary battery that the secondary battery delivers, and if the secondary battery is charged, the same voltage that charges the secondary battery will be available to the power adapter 92 to charge the energy storage device 90 because they are connected in parallel. In this way the block 94 and the parallel circuit element 98 have electrical properties that are indistinguishable at the user interface connection 96. If, in another example, the parallel circuit element 98 is a generator, the power adapter 94 adapts the voltage it receives from the energy storage device 90 to supply the same voltage to the user interface connection 96 as the generator supplies (for as long as the energy storage device can discharge). A utility distribution grid could also be the parallel circuit element 98, and the energy output of the grid would be matched by the energy output from the block 94 for as long as the energy storage device 90 can sustain that output.

It is to be understood that methodological instructions according to the present invention may be programmed into software executed by a general use computer, a special use computer, a special purpose processing device to perform a certain function or group of functions, or as firmware or other similar computer-readable instructions executed by these computing and processing devices. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM, DVD, BD or other optical disk storage, magnetic disk storage or other magnetic or solid-state storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

As used herein, the terms "algorithm," "method," or "process" can refer to software objects or routines that execute on the computing system. The different components, modules, engines, and services described herein may be implemented as objects or processes that execute on the computing system (e.g., as separate threads). While elements of the system and methods described herein are preferably implemented in software, implementations in hardware or a combination of software and hardware are also possible and contemplated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A circuit rendering an energy storage device parallelable, the circuit comprising:
   (a) an energy storage device having a state of charge and a source connection with a source potential; and
   (b) a power adapter having a first connection electrically connected to the source connection and a second connection having a terminal potential,
   wherein while the energy storage device is discharged using the power adapter, the power adapter converts between the source potential and the terminal potential such that the terminal potential follows a static, monotonic voltage function proportional to the state of charge of the energy storage device; wherein while the energy storage device is charged using the power adapter, the power adapter converts between the terminal potential and the source potential such that the source potential follows a function proportional to the state of charge of the energy storage device.

2. The circuit of claim 1, wherein the power adapter comprises:
   (a) a DC to DC converter having a first connection, a second connection, and a third connection, the first connection being electrically connected to the source connection, and the second connection having a terminal potential; and
   (b) a system controller having a controller connection electrically connected to the third connection of the DC to DC converter,
   wherein the system controller directs the DC to DC converter to convert between the source potential and the terminal potential by following a static, monotonic voltage function proportional to the state of charge of the energy storage device.

3. The circuit of claim 2, wherein the system controller directs the DC to DC converter to convert between the source potential and the terminal potential by supplying a duty factor to the DC to DC converter.

4. The circuit of claim 3, wherein the system controller adjusts the duty factor supplied to the DC to DC converter by:
   (a) calculating the state of charge of the energy storage device,
   (b) calculating a reference voltage by comparing the state of charge to information regarding a relationship between the state of charge and target energy storage device properties,
   (c) using a feedback control loop to determine the adjustment to the duty factor by comparing the reference voltage to a measurement of the present terminal potential, and,
   (d) outputting an adjusted duty factor to the DC to DC converter, whereby the DC to DC converter converts between the source potential and the terminal potential according to the adjusted duty factor.

5. The circuit of claim 4, wherein the voltage function is a linear function of the state of charge of the energy storage device connected to the power adapter.

6. The circuit of claim 4, wherein the voltage function is a function to approximate an energy discharge profile of an energy storage device selected from a group consisting of real and theoretical energy storage devices.

7. The circuit of claim 3, wherein the system controller is a pulse width modulation controller.

8. The circuit of claim 1, further comprising a start switch electrically connected to the power adapter, wherein the power adapter will not make the terminal potential available for access unless the start switch is closed.

9. The circuit of claim 1, wherein the energy storage device is selected from a group consisting of batteries, flywheels, capacitive devices, pumped hydro, superconductive magnetic energy storage, and combinations thereof.

10. The circuit of claim 1 further comprising a user interface connection, wherein the second connection of the power adapter is electrically connected to the user interface connection.

11. The circuit of claim 10, wherein the second connection of the power adapter is electrically connected to the user interface connection in parallel with an additional energy storage device having an additional source potential, wherein the additional energy storage device is connected to the user interface connection via an additional power adapter that converts the additional source potential into an additional terminal potential, wherein the additional terminal potential closely resembles output of the static, monotonic voltage function proportional to the state of charge of the energy storage device connected to the first connection of the power adapter.

12. The circuit of claim 1 further comprising an inverter having a DC connection, wherein the second connection of the power adapter is electrically connected to the DC connection.

13. The circuit of claim 1, wherein the second connection of the power adapter is electrically connected to a user interface connection in parallel with a parallel circuit element having a parallel source potential, wherein the parallel source potential closely resembles output of the static, monotonic voltage function proportional to the state of charge of the energy storage device connected to the first connection of the power adapter.

14. The circuit of claim 13, wherein the parallel circuit element is selected from a group consisting of one or more energy storage devices, one or more energy generation devices, a utility distribution grid, an additional energy storage device connected to an additional power adapter, and combinations thereof.

15. The circuit according to claim 1, wherein the second connection of the power adapter is electrically connected to a load and the energy storage device is discharged to supply power to the load.

16. A method of connecting and converting a plurality of energy storage devices in a parallel topology, the method comprising the steps of:
   (a) connecting at least two energy storage devices to at least two DC to DC converters, such that each energy storage device is connected to a different DC to DC converter, and wherein each of the energy storage devices has a state of charge and an energy storage device potential;
   (b) connecting at least two system controllers to the DC to DC converters, such that each DC to DC converter is connected to a different system controller without the system controllers intercommunicating; and
   (c) while the energy storage devices are discharged using the at least two DC to DC converters, instructing the system controllers to direct the DC to DC converters to produce an output potential that follows a static, monotonic voltage function proportional to the state of charge of the energy storage devices, wherein the energy discharge profiles of each of the DC to DC converters are the same; and
      while the energy storage devices are charged using the at least two DC to DC converters, instructing the system controllers to direct the DC to DC converters to produce an output potential that follows a function proportional to the state of charge of the energy storage device.

17. The method of claim 16, wherein the static, monotonic voltage function is a function approximating an energy discharge profile of an energy storage device selected from a group consisting of real and theoretical energy storage devices.

18. A circuit rendering an energy storage device parallelable, the circuit comprising:
   (a) an energy storage device having a state of charge and a source connection with a source potential;
   (b) a DC to DC converter having a first connection electrically connected to the source connection, the DC to DC converter having second connection having a terminal potential, the DC to DC converter having a third connection;
   (c) a system controller connected to the third connection of the DC to DC converter;
   wherein while the energy storage device is discharged using the DC to DC converter, the DC to DC converter converts between the source potential and the terminal potential such that the terminal potential follows a static, monotonic voltage function of the state of charge of the energy storage device;
   wherein while the energy storage device is charged using the DC to DC converter, the DC to DC converter converts between the terminal potential and the source potential such that the source potential follows a function proportional to the state of charge of the energy storage device;
   wherein the system controller directs the DC to DC converter to convert between the source potential and the terminal potential by supplying a duty factor to the DC to DC converter, and the system controller adjusts the duty factor supplied to the DC to DC converter by:
   (a) calculating the state of charge of the energy storage device,
   (b) calculating a reference voltage by comparing the state of charge to information regarding a relationship between the state of charge and target energy storage device properties,
   (c) using a feedback control loop to determine the adjustment to the duty factor by comparing the reference voltage to a measurement of the present terminal potential, and
   (d) outputting an adjusted duty factor to the DC to DC converter, whereby the DC to DC converter converts between the source potential and the terminal potential according to the adjusted duty factor.

19. The circuit of claim 18, wherein the voltage function is a linear function of the state of charge of the energy storage device connected to the power adapter.

20. The circuit of claim 18, wherein the voltage function is a function to approximate an energy discharge profile of an energy storage device selected from a group consisting of real and theoretical energy storage devices.

* * * * *